United States Patent [19]

Ishihara et al.

[11] Patent Number: 4,680,353

[45] Date of Patent: Jul. 14, 1987

[54] PROCESS FOR PRODUCTION OF STYRENE POLYMERS

[75] Inventors: Nobuhide Ishihara; Masahiko Kuramoto, both of Sodegaura; Michitake Uoi, Ichihara, all of Japan

[73] Assignee: Idemitsu Kosan Company Limited, Tokyo, Japan

[21] Appl. No.: 923,395

[22] Filed: Oct. 23, 1986

[30] Foreign Application Priority Data

Nov. 11, 1985 [JP] Japan ............................. 60-252531
May 6, 1986 [JP] Japan ............................. 61-101927

[51] Int. Cl.$^4$ ............................................... C08F 4/64
[52] U.S. Cl. ........................................ 526/160; 526/138; 526/159
[58] Field of Search .............. 526/159, 92, 160, 138

[56] References Cited

U.S. PATENT DOCUMENTS

| | | | |
|---|---|---|---|
| 3,014,887 | 12/1961 | Haward | 526/159 |
| 3,049,524 | 8/1962 | Voltz | 526/159 |
| 3,069,407 | 12/1962 | Tsou et al. | 526/159 |
| 3,161,624 | 12/1964 | Natta et al. | 526/159 |
| 3,414,553 | 12/1968 | Kern | 526/159 |
| 3,489,737 | 1/1970 | Natta et al. | 526/159 |
| 3,639,332 | 1/1972 | Coover et al. | 526/159 |
| 4,246,134 | 1/1981 | Uvarov et al. | 526/159 |

*Primary Examiner*—Paul R. Michl
*Assistant Examiner*—Angela Louise Fugo
*Attorney, Agent, or Firm*—Frishauf, Holtz, Goodman & Woodward

[57] ABSTRACT

A process for production of styrene polymers of high syndiotactic configuration is disclosed, comprising polymerizing styrene or styrene derivatives by the use of a catalyst comprising: (A) a titanium compound, e.g., at least one compound selected from those represented by the formulae: $TiR^1_a R^2_b R^3_c X^1_{4-(a+b+c)}$ and $TiR^1_d R^2_e X^1_{3-(d+e)}$ (all the symbols are as defined in the appended claims); and (B) a contact product of an organoaluminum compound and a condensation agent, e.g., a product resulting from modification of trimethylaluminum with water. Because of such high syndiotactic configuration, the styrene polymers are greater in thermal resistance and solvent resistance than conventional atactic polystyrene.

3 Claims, 14 Drawing Figures

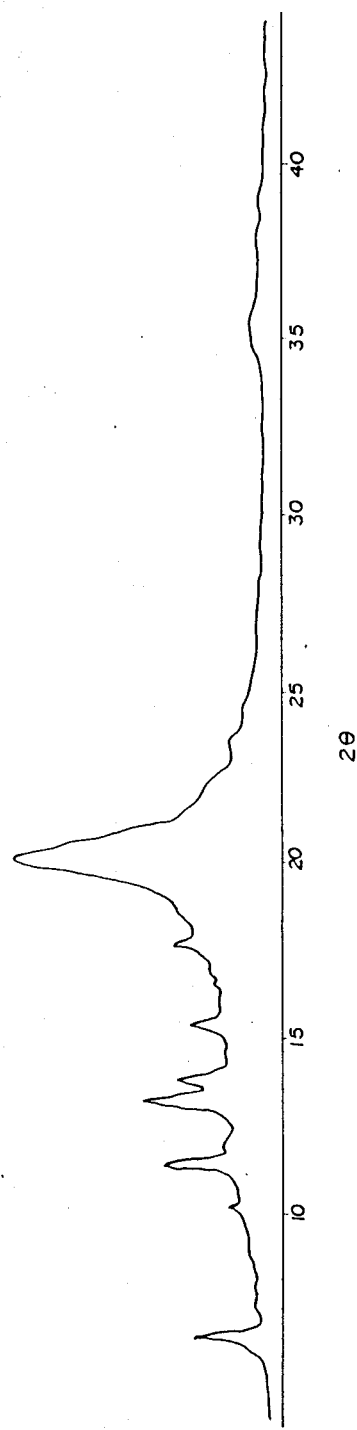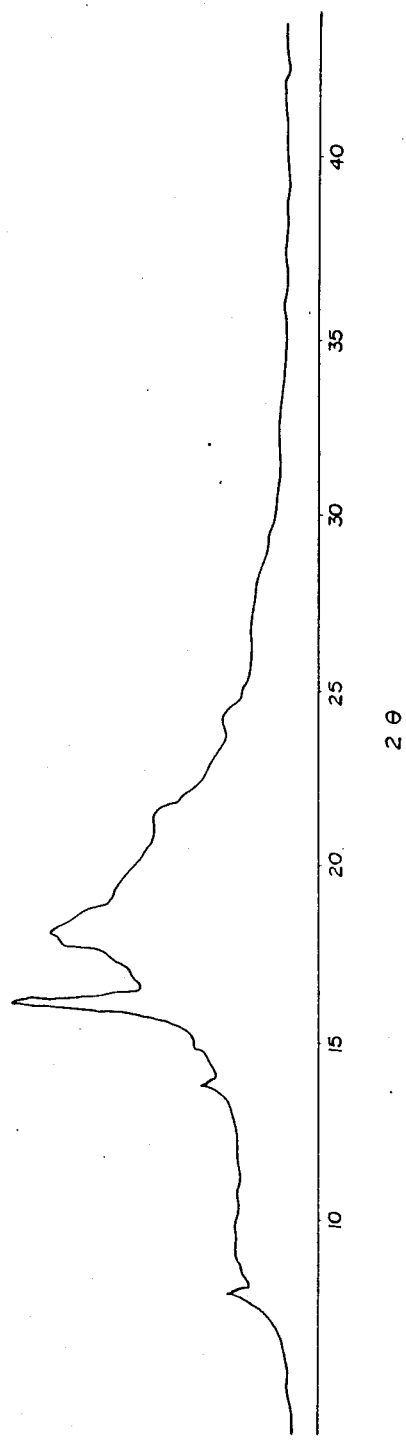
FIG. 2(a)
FIG. 2(b)

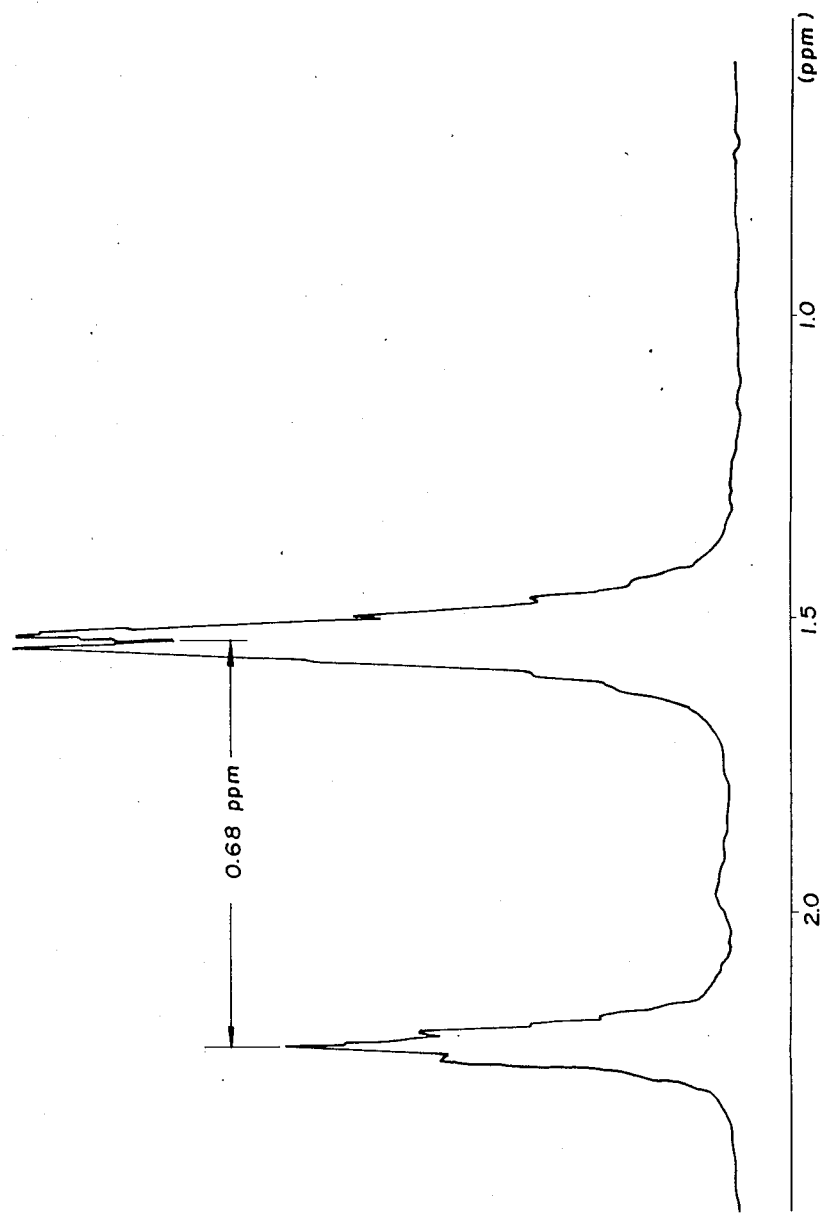

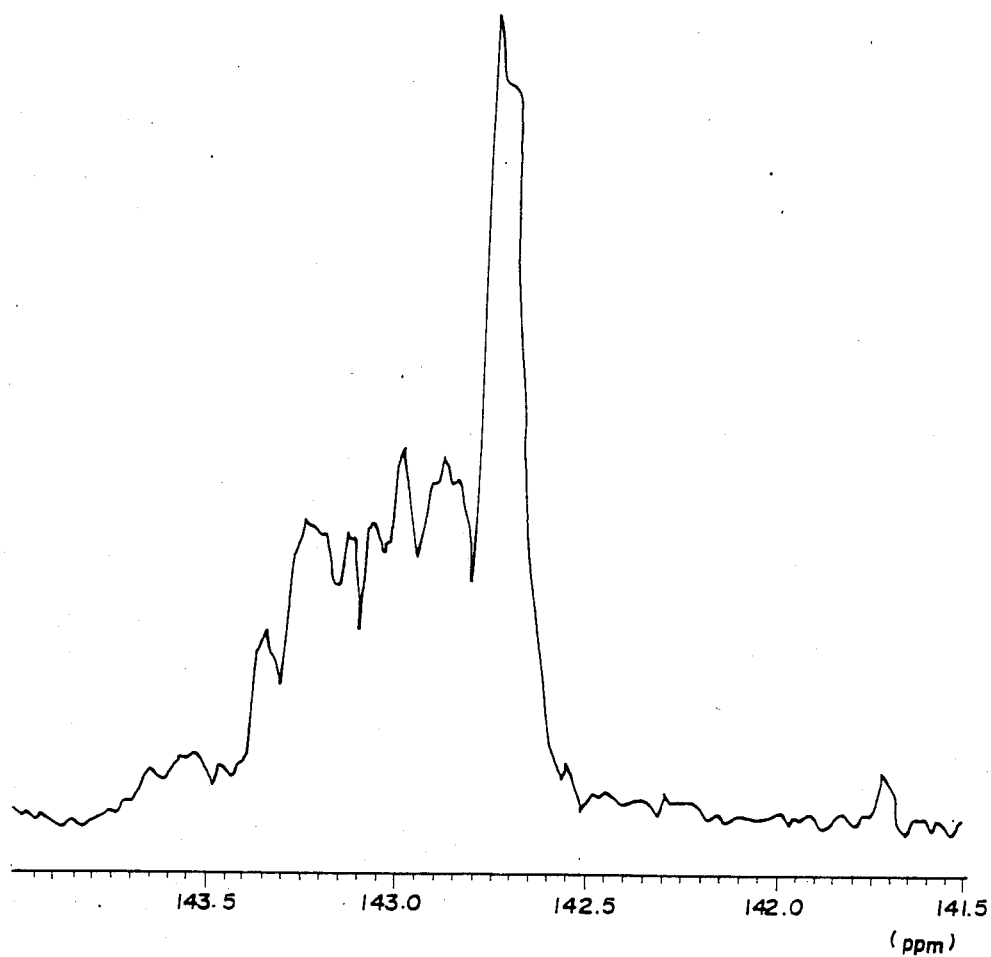

PROCESS FOR PRODUCTION OF STYRENE POLYMERS

BACKGROUND OF THE INVENTION

The present invention relates to a process for production of styrene polymers and more particularly to a process for producing styrene polymers in which polymer side chains are mainly in the syndiotactic configuration.

As is well known, substituted vinyl compound polymers can be divided into three groups, atactic, isotactic and syndiotactic, depending on the configuration of substituents (side chains) in the polymers. A number of polymers having the isotactic and atactic configurations have been produced.

In connection with styrene polymers, it is known that when usual radical polymerization initiators are used, almost all of the styrene polymers formed are of the atactic configuration although there can be obtained only a limited number of styrene polymers rich in the syndiotactic configuration, and that when Ziegler type catalysts are used, styrene polymers having the isotactic configuration are obtained. However, styrene polymers of high syndiotactic configuration have not yet been produced by any conventionally used methods; that is, a method whereby styrene polymers of high syndiotactic configuration can be obtained has not been known.

SUMMARY OF THE INVENTION

An object of the present invention is to provide a process for producing styrene polymers in which polymer side chains are mainly in the syndiotactic configuration.

It has been found that styrene polymers of high syndiotactic configuration can be obtained by polymerizing styrene or its derivatives by the use of a catalyst comprising specified transition metal compound and organoaluminum compound components.

The present invention relates to a process for producing styrene polymers which comprises polymerizing styrene or styrene derivatives by the use of a catalyst comprising:

(A) a titanium compound, and
(B) a contact product of an organoaluminum compound and a condensation agent.

BRIEF DESCRIPTION OF THE DRAWINGS

FIGS. 2(a) and 2 (b) show X-ray diffraction patterns of the polymer obtained in Example 1 and isotactic polystyrene, respectively, wherein θ indicates a Bragg angle (°);

FIGS. 3(a) and 3 (b) show $^1$H-NMRs of the polymer obtained in Example 1 and isotactic polystyrene, respectively;

FIGS. 5(a) and 5 (b) show aromatic ring $C_1$ carbon signals in $^{13}$C-NMR of the polymer obtained in Example 36 and atactic poly(p-chlorostyrene), respectively.

DETAILED DESCRIPTION OF THE INVENTION

Figure 1A:
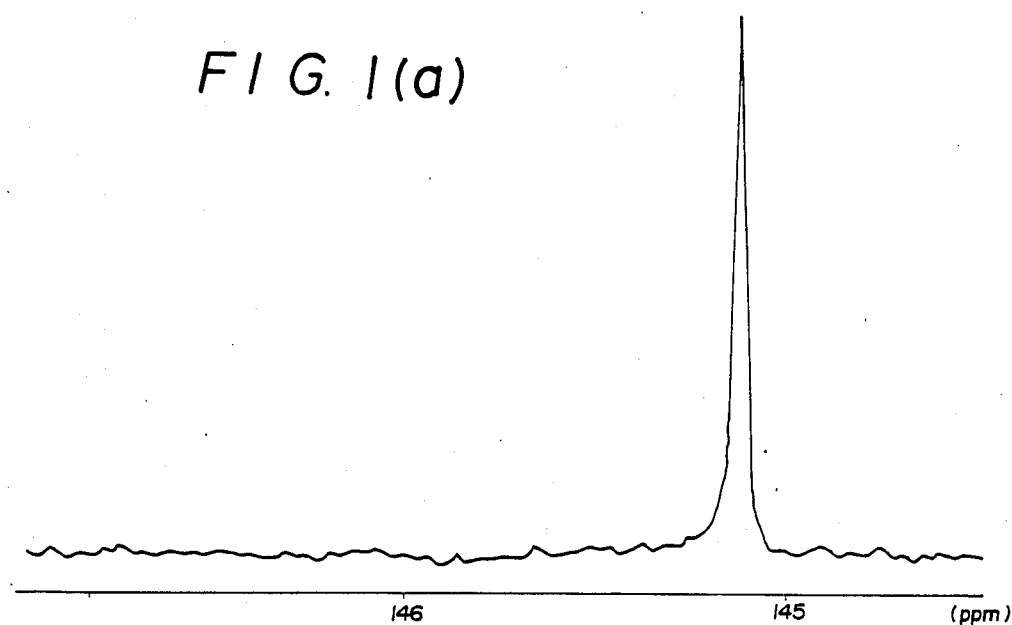
FIGS. 1(a) to 1 (c) show aromatic ring $C_1$ carbon signals in $^{13}$C-NMR of the polymer obtained in Example 1, isotactic polystyrene and atactic polystyrene, respectively.

The catalyst which is used in the process of the present invention contains as main components the following components (A) and (B):

(A) a titanium compound, and
(B) a contact product of an organoaluminum compound and a condensation agent.

As the component (A), various titanium compounds can be used. Preferred among these compounds are titanium compounds and titanium chelate compounds represented by the following general formulae (I) and (II):

General Formula (I)

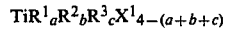
$$TiR^1_a R^2_b R^3_c X^1_{4-(a+b+c)}$$

General Formula (II)

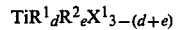
$$TiR^1_d R^2_e X^1_{3-(d+e)}$$

(wherein $R^1$, $R^2$ and $R^3$ each represent a hydrogen atom, an alkyl group having 1 to 20 carbon atoms, an alkoxy group having 1 to 20 carbon atoms, an aryl group having 6 to 20 carbon atoms, an alkylaryl group, an arylalkyl group, an acyloxy group having 1 to 20 carbon atoms, a cyclopentadienyl group, a substituted cyclopentadienyl group or an indenyl group, $X^1$ represents a halogen atom, a, b and c each represent an integer of 0 to 4, and d and e each represent an integer of 0 to 3).

The symbols in the general formulae (I) and (II) are described in detail.

$R^1$, $R^2$ and $R^3$ each represent a hydrogen atom, an alkyl group having 1 to 20 carbon atoms (specifically a methyl group, an ethyl group, a propyl group, a butyl group, an amyl group, an isoamyl group, an isobutyl group, an octyl group and a 2-ethylhexyl group), an alkoxy group having 1 to 20 carbon atoms (specifically a methoxy group, an ethoxy group, a propoxy group, a butoxy group, an amyloxy group, a hexyloxy group and a 2-ethylhexyloxy group), an aryl group having 6 to 20 carbon atoms, an alkylaryl group, an arylalkyl group (specifically a phenyl group, a tolyl group, a xylyl group and a benzyl group), an acyloxy group having 1 to 20 carbon atoms (specifically a heptadecylcarbonyloxy group), a cyclopentadienyl group, a substituted cyclopentadienyl group (specifically a methylcyclopentadienyl group, a 1,2-dimethylcyclopentadienyl group and a pentamethylcyclopentadienyl group), or an indenyl group. These $R^1$, $R^2$ and $R^3$ may be the same or different.

$X^1$ represents a halogen atom, such as chlorine, bromine, iodine or fluorine.

a, b and c each represent an integer of 0 to 4.
d and e each represent an integer of 0 to 3.

Representative examples of the tetravalent titanium compounds and titanium chelate compounds represented by the general formula (I) are methyltitanium trichloride, titanium tetramethoxide, titanium tetraethoxide, titanium monoisopropoxy trichloride, titanium diisopropoxy dichloride, titanium triisopropoxy monochloride, tetra(2-ethylhexyloxy)titanium, cyclopentadienyltitanium trichloride, biscyclopentadienyl titanium dichloride, titanium tetrachloride, titanium tetrabromide, bis(2,4-pentanedionate)titanium oxide, bis(2,4-pentanedionate)titanium dichloride, and bis(2,4-pentanedionate)titanium dibutoxide.

As the component (A), as well as the above compounds, condensed titanium compounds represented by the general formula (III):

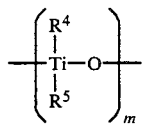

(wherein $R^4$ and $R^5$ each represent a halogen atom, an alkoxy group having 1 to 20 carbon atoms, or an acyloxy group having 1 to 20 carbon atoms, and m represents an integer of 2 to 20) can be used.

The above titanium compounds may be used in the form that they are adsorbed or deposited on a carrier, such as magnesium compounds, silica and alumina, or in the form of complexes with esters or ethers.

Typical examples of trivalent titanium compounds represented by the general formula (II) to be used as the component (A) are titanium trihalide such as titanium trichloride and cyclopentadienyl titanium compounds such as cyclopentadienyl titanium dichloride. In addition, trivalent titanium compounds resulting from reduction of tetravalent titanium compounds can be used. These trivalent titanium compounds can be used in the form of complexes with esters, ehters and so forth.

The component (B) to be used in combination with the component (A) is a contact product obtained by contacting an organoaluminum compound with a condensation agent. Such organoaluminum compounds include those represented by the general formula (IV):

(wherein $R^6$ represents an alkyl group having 1 to 8 carbon atoms). Representative examples of the organoaluminum compounds represented by the general formula (IV) are trimethylaluminum, triethylaluminum and triisobutylaluminum. Of these compounds, trimethylaluminum is most preferred.

A typical example of the condensation agent to be condensed with the above organoaluminum compound is water. In addition, any compounds with which alkylaluminum undergoes a condensation reaction can be used.

Representative examples of the reaction product between the alkylaluminum compound and water, which is a typical example of the component (B), are alkylaluminoxanes represented by the general formula (V):

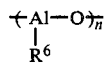

(wherein n=2 to 50). There are no special limitations to the reaction between the organoaluminum compound and water; it suffices that the organoaluminum compound and water are reacted by known techniques, such as (1) a method in which the organoaluminum compound is previously dissolved in an organic solvent, and then is contacted with water, (2) a method in which the organoaluminum compound is previously added at the time of polymerization, and then water is added, and (3) a method in which water of crystallization contained in metal salts and so forth, or water adsorbed on inorganic or organic compounds is reacted.

In the process of the present invention, the component (B) of the catalyst can be used alone. In addition, the component (B) can be used as an admixture with organoaluminum compounds (e.g., those represented by the general formula (IV)) or other organometallic compounds, or in the state that the component (B) is adsorbed or deposited on inorganic substances and the like.

The catalyst to be used in the process of the present invention contains the components (A) and (B) as main components and, if desired, may further contain other catalytic components. In use, the ratio of the component (A) to the component (B) varies depending on conditions such as the type of each component and the type of the starting material, and thus cannot be determined unconditionally. Usually the components (A) and (B) are used in such a ratio that the molar ratio of aluminum in the component (B) to titanium in the component (A), i.e., aluminum/titanium, is 1/1 to $1 \times 10^6/1$, with the range of 10/1 to $1 \times 10^4/1$ being preferred.

The monomer to be polymerized by the process of the present invention is styrene or its derivatives. These styrene derivatives include alkylstyrene such as methylstyrene, ethylstyrene, butylstyrene, p-tert-butylstyrene, and dimethylstyrene, halogenated styrene such as chlorostyrene, bromostyrene and fluorostyrene, halogen-substituted alkylstyrene such as chloromethylstyrene, alkoxystyrene such as methoxystyrene, carboxymethylstyrene, alkyletherstyrene, alkylsilylstyrene, vinylbenzenesulfonic acid esters, and vinylbenzyldialkoxy phosphide.

In accordance with the process of the present invention, the above styrene or its derivative is polymerized in the presence of a catalyst comprising the component (A) and (B) as described above. This solution may be bulk polymerization or solution polymerization using a solvent, e.g., aliphatic hydrocarbons such as pentane, hexane and heptane, alicyclic hydrocarbons such as cyclohexane, and aromatic hydrocarbons such as benzene, toluene and xylene. The polymerization temperature is not critical. In general, it is 0° to 90° C. and preferably 20° to 70° C.

In accordance with the process of the present invention, styrene polymers (e.g., polystyrene, polyalkylstyrene, and poly(halogenated styrene)) having a novel stereospecific structure that side chains are mainly in the syndiotactic configuration, or polystyrene polymers including the above styrene polymers can be produced. These styrene polymers in which side chains are mainly in the syndiotactic configuration mean that a degree of syndiotacticity at a racemidiad in the nuclear magnetic resonance (NMR) spectrum is higher than those in polymers obtained by conventional radical polymerization; for example, polystyrene having a methyl ethyl ketone-insoluble polymer content of at least 75%, and polymethylstyrene having a methyl ethyl ketone-insoluble polymer content of at least 85%.

The above styrene polymers in which side chains are mainly in the syndiotactic configuration are either crystalline or amorphous. These crystalline styrene polymers are higher in thermal resistance and better in solvent resistance than commonly used atactic polystyrenes and, therefore, they are useful as materials for use in fields where thermal resistance and chemical resistance are required, or as modification materials to be blended with other resins. Even in the case of amorphous styrene polymers, if various functional groups are introduced in benzene rings as side chains, the resulting polymers can be widely used as intermediate materials for the production of functional polymers.

The present invention is described in greater detail with reference to the following examples.

EXAMPLE 1

(1) Preparation of Aluminum Compound Component (B)

In 200 milliliters (ml) of a toluene solvent, 47.4 ml (0.492 mol) of trimethylaluminum and 35.5 grams (g) (0.142 mol) of copper sulfate pentahydrate were reacted at 20° C. for 24 hours. Upon removal of a solid portion from the reaction mixture, a toluene solution containing 12.4 g of methylaluminoxane as the aluminum compound component (B) was obtained.

(2) Polymerization of Styrene

A mixture of 100 ml of toluene, 0.05 millimole (mmol) of titanium tetrachloride and 40 mmol (as aluminum atom) of the methylaluminoxane obtained in (1) above was placed in a 500-milliliter reactor, and then 180 ml of styrene was introduced in the reactor at 20° C. and polymerized for 1 hour. After completion of the reaction, the reaction product was washed with a hydrochloric acid/methanol mixture to decompose the catalyst component and then dried to yield 7.0 g of a polymer.

The polymer thus obtained was subjected to Soxlet extraction using methyl ethyl ketone as a solvent. The extraction residue was 95% by weight (wt. %). For this polymer, the weight average molecular weight was 350,000, the number average molecular weight was 160,000, and in its thermal differential analysis, the melting point was 270° C. and no heat absorption peak was detected in the neighborhood of 220° C.; i.e., the melting point of isotactic polystyrene.

Figure 1C:
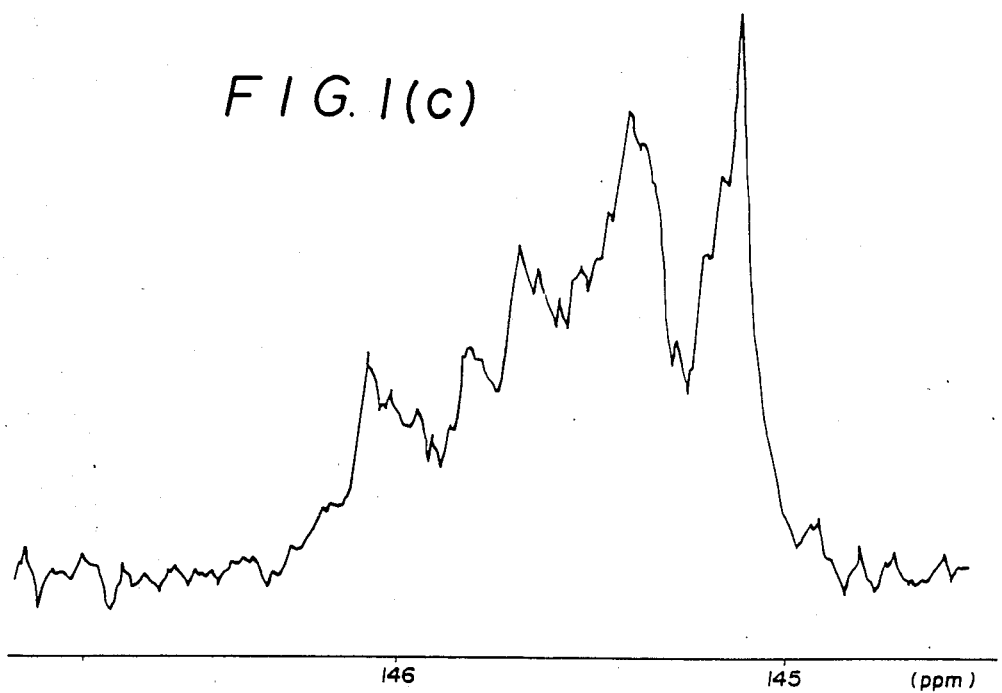
Figure 1B:
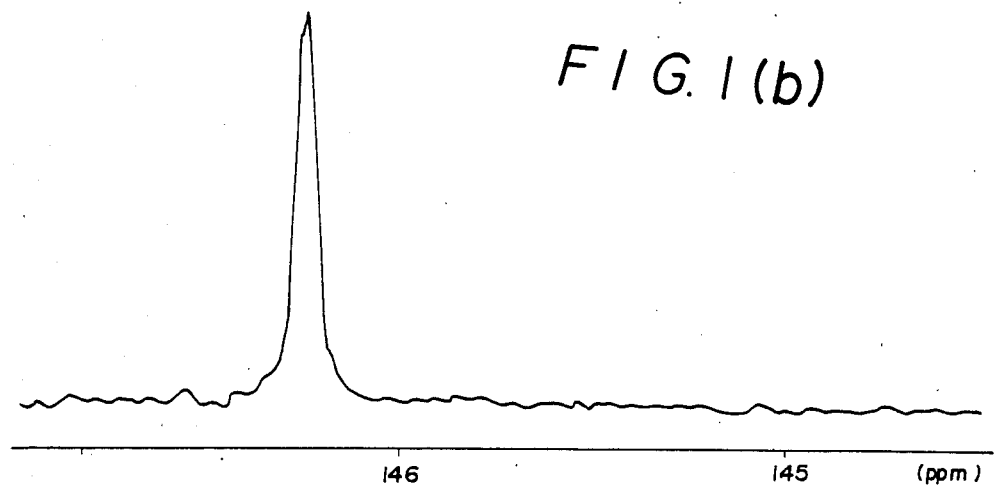
Figure 3A:
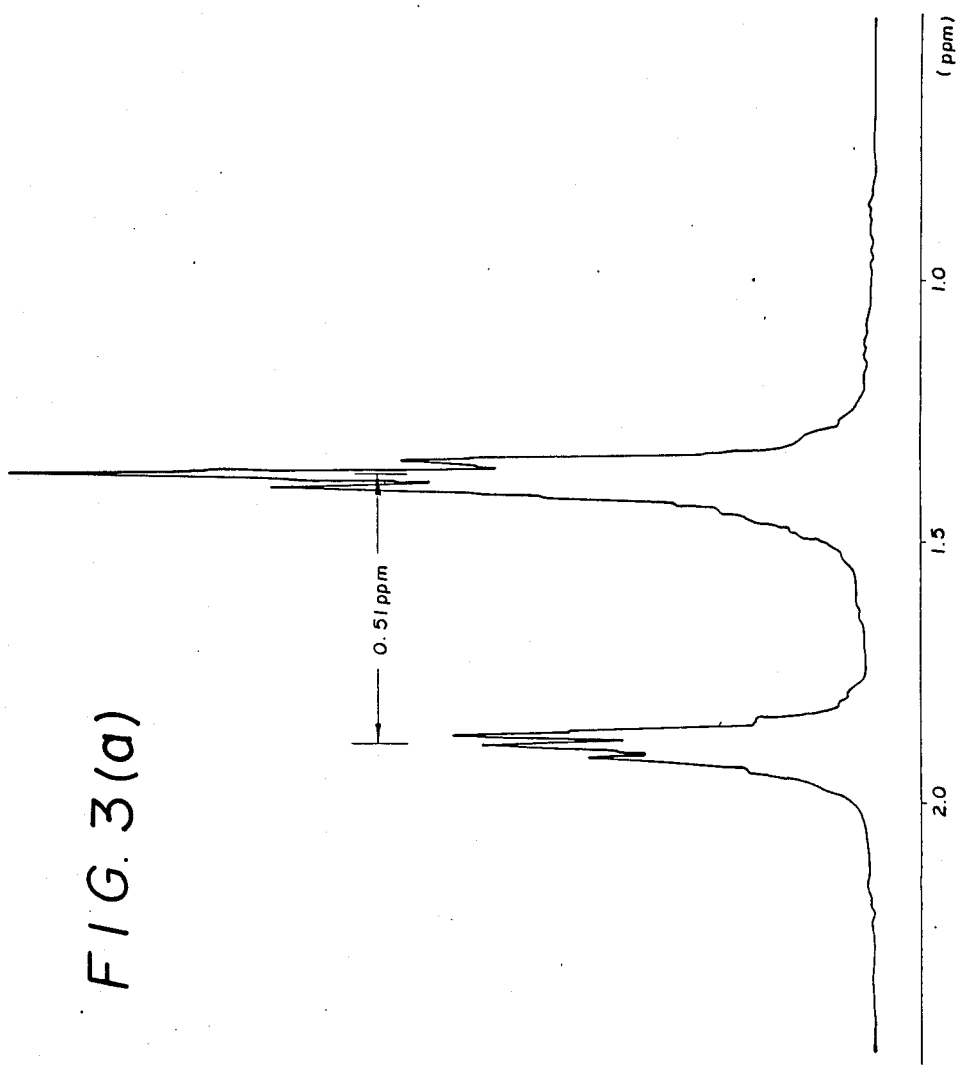

By comparison of a signal of $C_1$ carbon of the aromatic ring (a phenyl group in the case of polystyrene) in $^{13}$C-NMR (a nuclear magnetic resonance spectrum using a carbon isotope) (FIG. 1(a)) and an X-ray diffraction pattern (FIG. 2(a)) of the polymer with an aromatic ring $C_1$ carbon signal in $^{13}$C-NMR of isotactic polystyrene (FIG. 1(b)), an aromatic ring $C_1$ carbon signal in $^{13}$C-NMR of atactic polystyrene (FIG. 1(c)) and an X-ray diffraction pattern of isotactic polystyrene (FIG. 2(b)), and also of proton NMR ($^1$H-NMR) of the polymer (FIG. 3(a)) and $^1$H-NMR of isotactic polystyrene (FIG. 3(b)), it was found that the polymer was polystyrene of such high syndiotactic configuration that the tacticity as determined in the racemic diad was at least 90%, which had not been obtained.

EXAMPLE 2

A mixture of 100 ml of toluene and 40 mmol of trimethylaluminum was placed in a 500-milliliter polymerization vessel at room temperature and then 0.72 ml of water was dropped and reacted for 60 minutes. Then 0.05 mmol of titanium tetrachloride was added. After the mixture was raised in temperature to 50° C., 180 ml of styrene was introduced and polymerized for 2 hours. After completion of the reaction, the reaction product was washed with a large amount of a hydrochloric acid/methanol mixture and then dried to yield 1.0 g of a polymer.

The polymer thus obtained was extracted with methyl ethyl ketone by the use of a Soxlet extractor. The extraction residue was 98 wt. %. For the polymer remaining after the methyl ethyl ketone extraction, the weight average molecular weight was 246,000 and the number average molecular weight was 117,000. The melting point was 269° C. Both the X-ray diffraction pattern and NMR pattern of the polymer were similar to those in Example 1.

EXAMPLE 3

The procedure of (2) in Example 1 was repeated with the exception that 0.05 mmol of titanium tetrabromide was used as the titanium compound component.

The yield of the polymer was 3.5 g and the residue after the Soxlet extraction was 78 wt. %. For the polymer, the weight average molecular weight was 370,000 and the number average molecular weight was 160,000. The melting point and the results of the $^{13}$C-NMR analysis of the polymer were similar to those in Example 1.

EXAMPLE 4

The procedure of (2) in Example 1 was repeated with the exception that 0.05 mmol of titanium tetraethoxide was used as the titanium compound component.

The yield of the polymer was 18.0 g, and the residue after the Soxlet extraction was 97 wt. %. For the polymer, the weight average molecular weight was 430,000 and the number average molecular weight was 210,000. The melting point and the results of the $^{13}$C-NMR analysis of the polymer were similar to those in Example 1.

EXAMPLE 5

The procedure of (2) in Example 1 was repeated with the exceptions that 0.05 mmol of titanium tetraethoxide was used as the titanium compound component, the amount as aluminum atom of the methylaluminoxane used was 5 mmol, the amount of the styrene introduced was 120 ml, the amount of the toluene used was 20 ml, the polymerization temperature was 0° C. and the polymerization time was 5 hours. In this way, 0.8 g of a polymer was obtained.

The residue after the Soxlet extraction was 92 wt. %. For the polymer, the weight average molecular weight was 3,085,000 and the number average molecular weight was 1,387,000. The melting point and the results of the $^{13}$C-NMR analysis of the polymer were similar to those in Example 1.

EXAMPLE 6

The procedure of (2) in Example 1 was repeated with the exceptions that 0.05 mmol of titanium tetraethoxide was used as the titanium compound component, the amount as aluminum atom of the methylaluminoxane used was 5 mmol, the amount of the styrene introduced was 150 ml, the amount of the toluene used was 20 ml, the polymerization temperature was 20° C. and the polymerization time was 9 hours. In this way, 3.0 g of a polymer was obtained.

The residue after the Soxlet extraction was 84 wt. %. For the polymer, the weight average molecular weight was 2,480,000 and the number average molecular weight was 995,000. The melting point and the results of the $^{13}$C-NMR analysis of the polymer were similar to those in Example 1.

EXAMPLE 7

The procedure of (2) in Example 1 was repeated with the exceptions that 0.05 mmol of titanium tetraethoxide was used as the titanium compound component, the amount as aluminum atom of the methylaluminoxane used was 25 mmol, the amount of the styrene introduced was 50 ml, 100 ml of benzene was used as the solvent, the polymerization temperature was 50° C. and the polymerization time was 4 hours. In this way, 1.9 g of a polymer was obtained.

The residue after the Soxlet extraction was 89 wt. %. For the polymer, the weight average molecular weight was 301,000 and the number average molecular weight was 96,000. The melting point and the results of the $^{13}$C-NMR analysis of the polymer were similar to those in Example 1.

EXAMPLE 8

The procedure of Example 7 was repeated with the exceptions that 100 ml of xylene was used as a polymerization solvent and the polymerization time was 2 hours. In this way, 1.8 g of a polymer was used.

The residue after the Soxlet extraction was 92 wt. %. For the polymer, the weight average molecular weight was 201,000 and the number average molecular weight was 101,000. The melting point and the results of the $^{13}$C-NMR analysis of the polymer were similar to those in Example 1.

EXAMPLE 9

The procedure of (2) in Example 1 was repeated with the exceptions that 0.05 mmol of titanium tetraethoxide was used as the titanium compound component, the amount (as aluminum atom) of the methylaluminoxane used was 5 mmol, the amount of the styrene introduced was 150 ml, 50 ml of hexane was used as the solvent, the polymerization temperature was 50° C. and the polymerization time was 1.5 hours. In this way, 8.2 g of a polymer was obtained.

The residue after the Soxlet extraction was 92.7 wt. %. For the polymer, the weight average molecular weight was 756,000 and the number average molecular weight was 77,000. The melting point and the results of the $^{13}$C-NMR analysis of the polymer were similar to those in Example 1.

EXAMPLE 10

The procedure of (2) in Example 1 was repeated with the exceptions that 1 mmol of titanium tetraisopropoxide was used as a titanium compound, the amount as aluminum atom of the methylaluminoxane used was 40 mmol, the amount of the styrene introduced was 50 mol, the amount of the toluene used was 200 ml, the polymerization temperature was 50° C. and the polymerization time was 2 hours. In this way, 0.9 g of a polymer was obtained.

The residue after the Soxlet extraction was 78 wt. %. The melting point of the polymer and the results of the $^{13}$C-NMR analysis of the polymer were similar to those in Example 1.

EXAMPLE 11

The procedure of (2) in Example 1 was repeated with the exceptions that 0.01 mmol of titanium tetramethoxide was used as a titanium compound, the amount as aluminum atom of the methylaluminoxane used was 8 mmol, the amount of the styrene introduced was 100 ml, the amount of the toluene used was 100 ml, the polymerization temperature was 50° C. and the polymerization time was 2 hours. In this way, 6.2 g of a polymer was obtained.

The residue after the Soxlet extraction was 91 wt. %. The melting point and the results of the $^{13}$C-NMR analysis of the polymer were similar to those in Example 1.

EXAMPLE 12

The procedure of (2) in Example 1 was repeated with the exceptions that 1 mmol of titanium tetra-n-butoxide was used as a titanium compound, the amount as aluminum atom of the methylaluminoxane used was 40 mmol, the amount of the styrene introduced was 180 ml, the amount of the toluene was 100 ml, the polymerization temperature was 50° C. and the polymerization time was 2 hours. In this way, 10.5 g of a polymer were obtained.

The residue after the Soxlet extraction was 86 wt. %. The melting point and the results of the $^{13}$C-NMR analysis of the polymer were similar to those in Example 1.

EXAMPLE 13

The procedure of (2) in Example 1 was repeated with the exceptions that 1 mmol of tetra(octadecyloxy) titanium was used as a titanium compound, the amount as aluminum atom of the methylaluminoxane used was 40 mmol, the amount of the styrene introduced was 100 ml, the amount of the toluene used was 200 ml, the polymerization temperature was 50° C. and the polymerization time was 2 hours. In this way, 2.6 g of a polymer was obtained.

The residue after the Soxlet extraction was 87 wt. %. The melting point and the results of the $^{13}$C-NMR analysis of the polymer were similar to those in Example 1.

EXAMPLE 14

The procedure of (2) in Example 1 was repeated with the exception that 0.05 mmol of tetra(2-ethylhexyloxy)-titanium was used as the titanium compound component.

The yield of the polymer was 20.0 g. The residue after the Soxlet extraction was 90 wt. %. For the polymer, the weight average molecular weight was 450,000 and the number average molecular weight was 210,000. The melting point and the results of the $^{13}$C-NMR analysis of the polymer were similar to those in Example 1.

EXAMPLE 15

The procedure of (2) in Example 1 was repeated with the exception that 0.05 mmol of titanium monoisopropoxy trichloride was used as the titanium compound component.

The yield of the polymer was 10.0 g, and the residue after the Soxlet extraction was 97 wt. %. For the polymer, the weight average molecular weight was 360,000 and the number average molecular weight was 160,000. The melting point and the results of the $^{13}$C-NMR analysis of the polymer were similar to those in Example 1.

EXAMPLE 16

The procedure of (2) in Example 1 was repeated with the exception that 0.05 mmol of titanium diisopropoxy dichloride was used as the titanium compound component.

The yield of the polymer was 20.0 g, and the residue after the Soxlet extraction was 97 wt. %. For the polymer, the weight average molecular weight was 400,000 and the number average molecular weight was 210,000. The melting point and the results of the $^{13}$C-NMR analysis of the polymer were similar to those in Example 1.

EXAMPLE 17

The procedure of (2) in Example 1 was repeated with the exception that 0.05 mmol of titanium triisopropoxy monochloride was used as the titanium compound component.

The yield of the polymer was 17.0 g, and the residue after the Soxlet extraction was 97 wt. %. For the polymer, the weight average molecular weight was 380,000 and the number average molecular weight was 170,000. The melting point and the results of the $^{13}$C-NMR analysis of the polymer were similar to those in Example 1.

EXAMPLE 18

The procedure of (2) in Example 1 was repeated with the exceptions that 0.01 mmol of bis(2,4-pentanedionate) titanium dibutoxide was used as the titanium compound component and the amount (as aluminum atom) of the methylaluminoxane used was 9 mmol.

The yield of the polymer was 1.5 g. The residue after the Soxlet extraction was 55 wt. %. For the polymer, the weight average molecular weight was 380,000 and the number average molecular weight was 170,000. The melting point and the results of the $^{13}$C-NMR analysis of the polymer were similar to those in Example 1.

EXAMPLE 19

The procedure of (2) in Example 1 was repeated with the exceptions that 0.05 mmol of isopropoxytitanium tristearate was used as the titanium compound component, the amount as aluminum atom of the methylaluminoxane used was 40 mmol, the amount of the styrene introduced was 100 ml, the amount of the toluene used was 200 ml, the polymerization temperature was 50° C. and the polymerization time was 2 hours. In this way, 1.1 g of a polymer was obtained.

The residue after the Soxlet extraction was 89 wt. %. The melting point and the results of the $^{13}$C-NMR analysis of the polymer were similar to those in Example 1.

EXAMPLE 20

The procedure of (2) in Example 1 was repeated with the exception that 0.05 mmol of methyltitanium trichloride was used as the titanium compound component.

The yield of the polymer was 3.5 g, and the residue after the Soxlet extraction was 75 wt. %. For the polymer, the weight average molecular weight was 360,000 and the number average molecular weight was 150,000. The melting point and the results of the $^{13}$C-NMR analysis of the polymer were similar to those in Example 1.

EXAMPLE 21

The procedure of (2) in Example 1 was repeated with the exception that 0.05 mmol of biscyclopentadienyltitanium dichloride was used as the titanium compound component.

The yield of the polymer was 3.0 g, and the residue after the Soxlet extraction was 60 wt. %. For the polymer, the weight average molecular weight was 150,000 and the number average molecular weight was 71,000. The melting point and the results of the $^{13}$C-NMR analysis of the polymer were similar to those in Example 1.

EXAMPLE 22

The procedure of (2) in Example 1 was repeated with the exception that 0.05 mmol of cyclopentadienyltitanium trichloride was used as the titanium compound component.

The yield of the polymer was 16.5 g, and the residue after the Soxlet extraction was 97 wt. %. For the polymer, the weight average molecular weight was 280,000 and the number average molecular weight was 57,000. The melting point and the results of the $^{13}$C-NMR analysis were similar to those in Example 1.

EXAMPLE 23

A mixture of 100 ml of toluene and 40 mmol of trimethylaluminum was placed in a 500-milliliter polymerization vessel, and then 0.72 ml of water was dropped and the resulting mixture was stirred at room temperature for 40 minutes. Then, 0.05 mmol of cyclopentadienyltitanium trichloride was added. After the resulting mixture was raised in temperature to 50° C., 180 ml of styrene was introduced and polymerized for 2 hours.

The yield of the polymer was 17.6 g, and the residue after the Soxlet extraction was 96 wt. %. For the polymer, the weight average molecular weight was 110,000 and the number average molecular weight was 49,000. The melting point and the results of the $^{13}$C-NMR analysis of the polymer were similar to those in Example 1.

EXAMPLE 24

The procedure of Example 22 was repeated with the exception that 100 ml of heptane was used as a polymerization solvent in place of toluene.

The yield of the polymer was 16.3 g, and the residue after the Soxlet extraction was 95 wt. %. For the polymer, the weight average molecular weight was 307,000 and the number average molecular weight was 80,000. The melting point and the $^{13}$C-NMR analysis of the polymer were similar to those in Example 1.

EXAMPLE 25

The procedure of Example 22 was repeated with the exception that a mixture of 20 mmol (as aluminum atom) of the methylaluminoxane obtained in (1) of Example 1 and 20 mmol (as aluminum atom) of trimethylaluminum was used as the aluminum compound component.

The yield of the polymer was 16.3 g, and the residue after the Soxlet extraction was 95 wt. %. For the polymer the weight average molecular weight was 43,000 and the number average molecular weight was 22,000. The melting point and the results of the $^{13}$C-NMR analysis of the polymer were similar to those in Example 1.

EXAMPLE 26

The procedure of Example 22 was repeated with the exception that a mixture of 20 mmol (as aluminum atom) of the methylaluminoxane obtained in (1) of Example 1 and 20 mmol (as aluminum atom) of triisobutylaluminum was used as the aluminum compound component.

The yield of the polymer was 15.5 g, and the residue after the Soxlet extraction was 84.3 wt. %. For the polymer, the weight average molecular weight was 130,000 and the number average molecular weight was 73,000. The melting point and the results of the $^{13}$C-NMR analysis of the polymer were similar to those in Example 1.

EXAMPLE 27

The procedure of Example 22 was repeated with the exception that the polymerization temperature was 0° C.

The yield of the polymer was 11.6 g, and the residue after the Soxlet extraction was 93 wt. %. For the polymer, the weight average molecular weight was 410,000 and the number average molecular weight was 210,000. The melting point and the results of the $^{13}$C-NMR analysis of the polymer were similar to those in Example 1.

EXAMPLE 28

The procedure of Example 22 was repeated with the exceptions that in connection with the amount of the catalyst component used, the amount of the cyclopentadienyltitanium trichloride used was 0.02 mmol and the amount as aluminum atom of the methylaluminoxane used was 20 mmol.

The yield of the polymer was 23.8 g, and the residue after the Soxlet extraction was 93 wt. %. For the polymer, the weight average molecular weight was 140,000 and the number average molecular weight was 69,000. The melting point and the results of the $^{13}$C-NMR analysis of the polymer were similar to those in Example 1.

EXAMPLE 29

The procedure of (2) in Example 1 was repeated with the exceptions that 0.02 mmol of a titanium tetrachloride/ethyl benzoate complex was used as the titanium compound component, the amount as aluminum atom of the methylaluminoxane used was 10 mmol, the amount of the styrene introduced was 50 ml, the amount of the toluene used was 100 ml, the polymerization temperature was 50° C. and the polymerization time was 2 hours. In this way, 0.4 g of a polymer was obtained. The residue after the Soxlet extraction was 63 wt. %.

The melting point and the results of the $^{13}$C-NMR analysis of the polymer were similar to those in Example 1.

EXAMPLE 30

The procedure of (2) in Example 1 was repeated with the exceptions that 0.2 mmol as titanium atom of titanium tetrachloride deposited on magnesium diethoxide (146 mg (as titanium atom) of titanium tetrachloride per gram of magnesium diethoxide) was used as the titanium compound component, the amount as aluminum atom of the methylaluminoxane used was 10 mmol, the amount of the styrene introduced was 50 ml, the amount of the toluene was 100 ml, the polymerization temperature was 50° C. and the polymerization time was 2 hours. In this was, 0.5 g of a polymer was obtained.

The residue after the Soxlet extraction was 41 wt. %. The melting point and the results of the $^{13}$C-NMR analysis of the polymer were similar to those in Example 1.

EXAMPLE 31

The procedure of (2) in Example 1 was repeated with the exceptions that 0.02 mmol as titanium atom of titanium tetrachloride deposited on magnesium chloride (80 mg )as titanium atom) of titanium tetrachloride per gram of magnesium dichloride) was used as the titanium compound component, the amount as aluminum atom of the methylaluminoxane used was 10 mmol, the amount of the styrene introduced was 50 ml, the amount of the toluene used was 100 ml, the polymerization temperature was 50° C. and the polymerization time was 2 hours. In this way, 1.2 g of a polymer was obtained.

The residue after the Soxlet extraction was 88 wt. %. The melting point and the results of the $^{13}$C-NMR analysis of the polymer were similar to those in Example 1.

EXAMPLE 32

The procedure of (2) in Example 1 was repeated with the exceptions that 0.05 mmol as titanium atom of a magnesium stearate/titanium tetrachloride (1/0.1 by mole) mixture was used as the titanium compound component, the amount as aluminum atom of the methylaluminoxane used was 40 mmol, the amount of the styrene introduced was 180 ml, the amount of the toluene used was 100 ml, the polymerization temperature was 50° C. and the polymerization time was 2 hours. In this way, 3.8 g of a polymer was obtained.

The residue after the Soxlet extraction was 86 wt. %. The melting point and the results of the $^{13}$C-NMR analysis of the polymer were similar to those in Example 1.

EXAMPLE 33

The procedure of (2) in Example 1 was repeated with the exceptions that 0.05 mmol as titanium atom of a magnesium stearate/titanium tetraethoxide (1/0.1 by mole) mixture was used as the titanium compound component, the amount as aluminum atom of the methylaluminoxane used was 40 mmol, the amount of the styrene introduced was 180 ml, the amount of the toluene used was 100 ml, the polymerization temperature was 50° C. and the polymerization time was 2 hours. In this way, 1.2 g of a polymer was obtained.

The residue after the Soxlet extraction was 20 wt. %. The melting point and the results of the $^{13}$C-NMR analysis of the polymer were similar to those in Example 1.

EXAMPLE 34

The procedure of (2) in Example 1 was repeated with the exceptions that 0.02 mmol. of titanium trichloride was used as the titanium compound component, the amount as aluminum atom of the methylaluminoxane used was 20 mmol, the amount of the styrene introduced was 50 ml, the amount of the toluene used was 100 ml, the polymerization temperature was 50° C. and the polymerization time was 2 hours. In this way, 0.41 g of a polymer was obtained.

The residue after the Soxlet extraction was 30 wt. %. For the polymer, the weight average molecular weight was 871,000, the number average molecular weight was 413,000 and the melting point was 270° C. Based on the aromatic ring $C_1$ carbon signal in $^{13}$C-NMR of the polymer, it was determined that the tacticity as determined in the racemic pendad was 58%.

EXAMPLE 35

The procedure of Example 22 was repeated with the exception that 80 ml of p-methylstyrene was used as a starting monomer in place of styrene.

Figure 4:
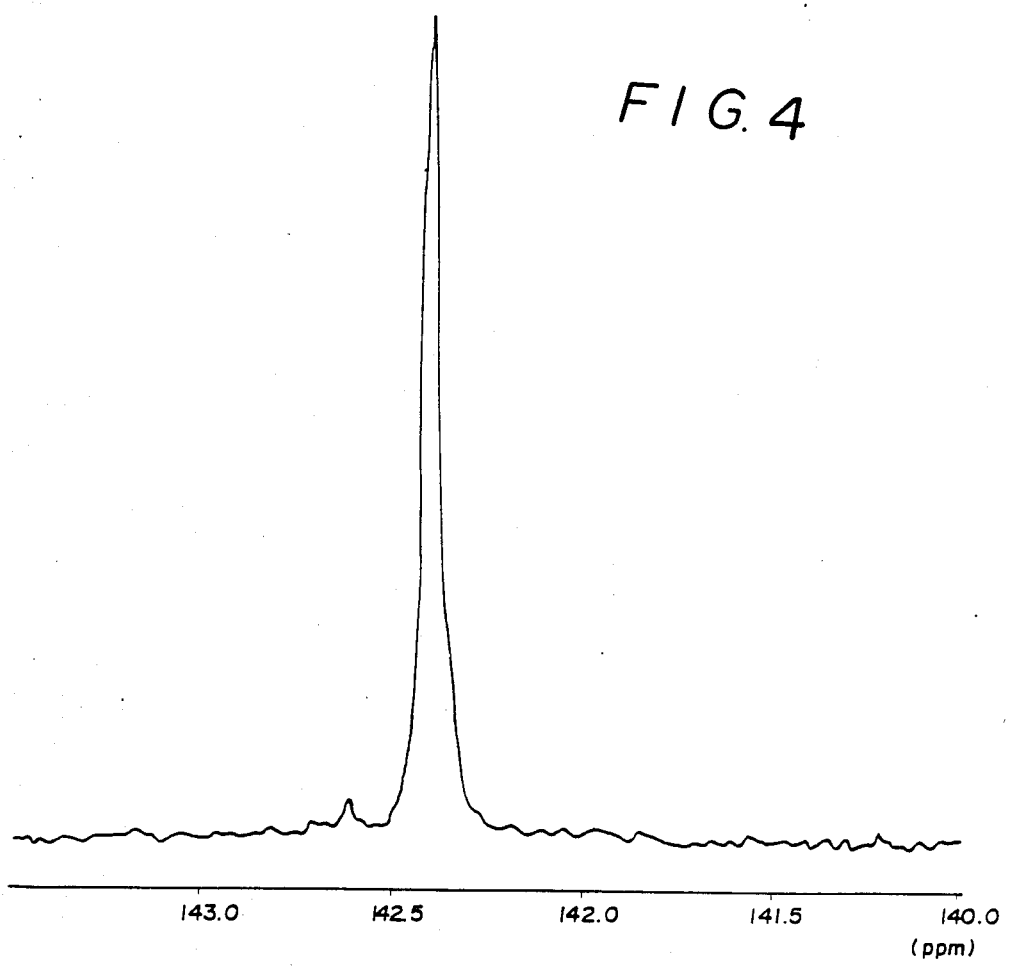
FIG. 4 shows an aromatic ring $C_1$ carbon signal in $^{13}$C-NMR of the polymer obtained in Example 35.

The yield of the polymer was 16.0 g, and the residue after the Soxlet extraction was 55 wt. %. For the polymer, the weight average molecular weight was 38,000, the number average molecular weight was 2,000 and the melting point was 168° C. Based on the aromatic ring $C_1$ carbon signal in $^{13}$C-NMR of the polymer (FIG. 4), it was determined that the polymer was of such syndiotactic configuration that the tacticity as determined in the racemic pentad was at least 90%.

EXAMPLE 36

The procedure of Example 22 was repeated with the exception that 40 ml of p-chlorostyrene was used as a starting monomer in place of the styrene.

Figure 5A:
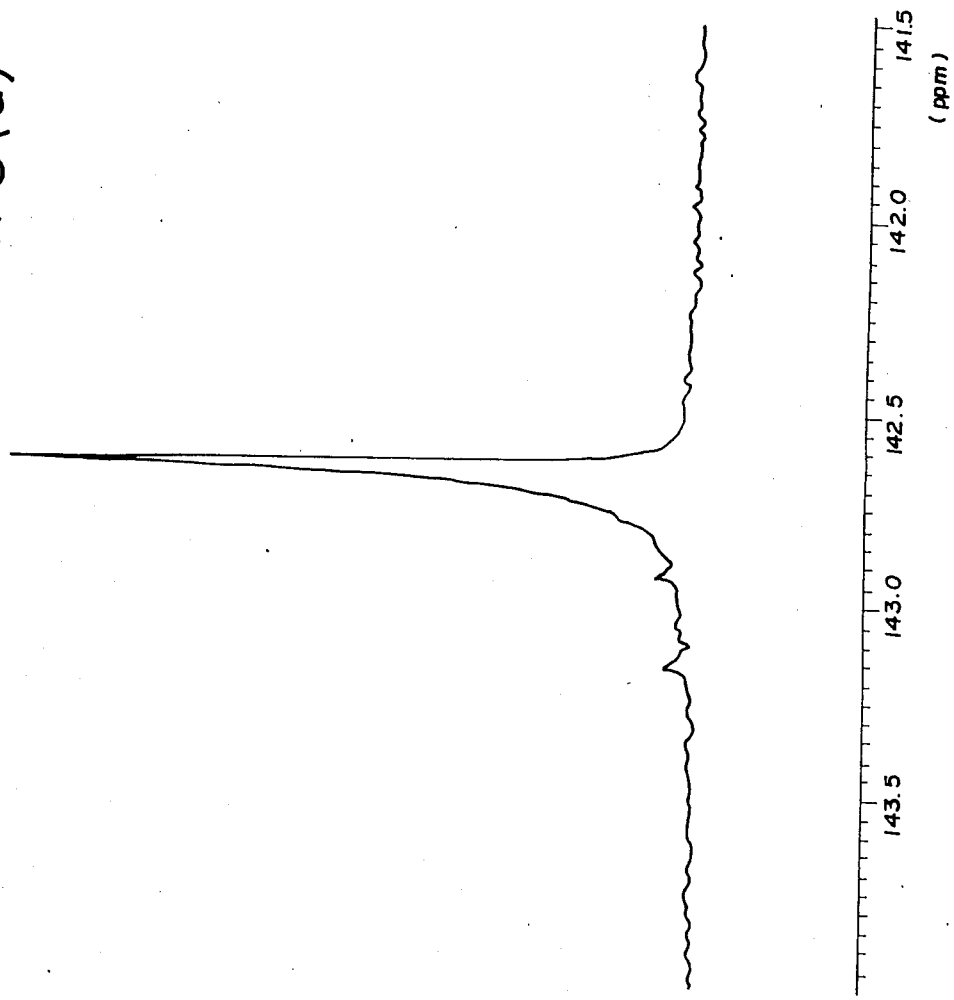

The yield of the polymer was 3.0 g, and the residue after the Soxlet extraction was 90 wt. %. For the polymer, the weight average molecular weight was 20,000, the number average molecular weight was 2,000 and the melting point was 295° C. By comparison of the aromatic ring $C_1$ carbon signal in $^{13}$C-NMR of the polymer (FIG. 5(a)) and the aromatic ring $C_1$ carbon signal in $^{13}$NMR of atactic poly(p-chlorostyrene) as a reference polymer (FIG. 5(b)), it was found that the polymer was poly(p-chlorlstyrene) of such high syndiotactic configuration that the tacticity as determined in the racemic pentad was at least 90%, which had never been obtained.

EXAMPLE 37

The procedure of Example 2 was repeated with the exceptions that 24.8 ml of m-chlorostyrene was used as a starting monomer and 0.05 mmol of tetraethoxytitanium was used as a titanium compound. In this way, 1.8 g of a polymer was obtained.

The residue after the Soxlet extraction was 51 wt. %. For the polymer, the weight average molecular weight was 47,000 and the number average molecular weight was 13,000.

Figure 6:
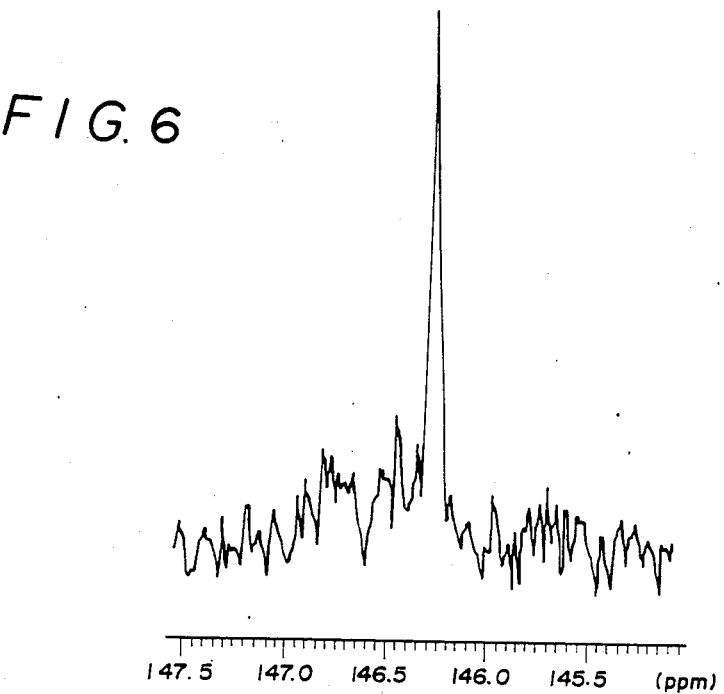
FIGS. 6, 7, 8 and 9 show aromatic ring $C_1$ carbon signals in $^{13}$C-NMR of the polymer obtained in Example 37, the polymer obtained in Example 38, the polymer obtained in Example 39 and the polymer obtained in Example 40, respectively.

Based on the aromatic ring $C_1$ carbon signal in $^{13}$C-NMR of the polymer (FIG. 6), it was determined that the polymer was of such syndiotactic configuration that the tacticity as determined at the racemic pentad was at least 80%.

EXAMPLE 38

The procedure of Example 35 was repeated with the exceptions that 17 ml of m-methylstyrene was used as a starting monomer, the amount as aluminum atom of the methylaluminoxane used was 30 mmol and the polymerization time was 3 hours. In this way, 15.1 g of a polymer was obtained.

Figure 7:
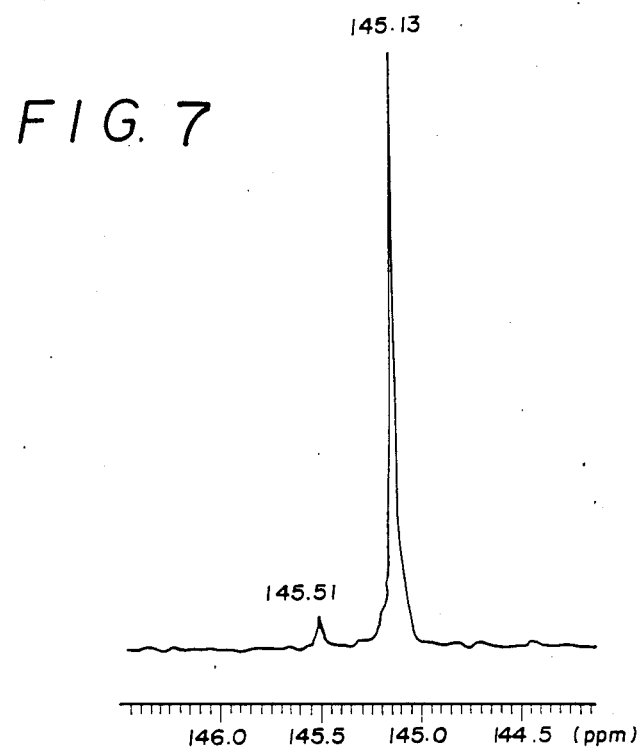

The residue after the Soxlet extraction was 98 wt. %. For the polymer, the weight average molecular weight was 59,000, the number average molecular weight was 26,000 and the melting point was 206° C. Based on the aromatic ring $C_1$ carbon signal in $^{13}$C-NMR of the polymer (FIG. 7), it was determined that the polymer was of such syndiotactic configuration that the tacticity as determined at the racemic pentad was at least 92%.

EXAMPLE 39

The procedure of Example 35 was repeated with the exceptions that 23.9 ml of p-fluorostyrene was used as a starting monomer, the amount as aluminum atom of the methylaluminoxane used was 30 mmol and the polymerization was conducted at 50° C. for 5 hours. In this way, 0.2 g of a polymer was obtained.

Figure 8:
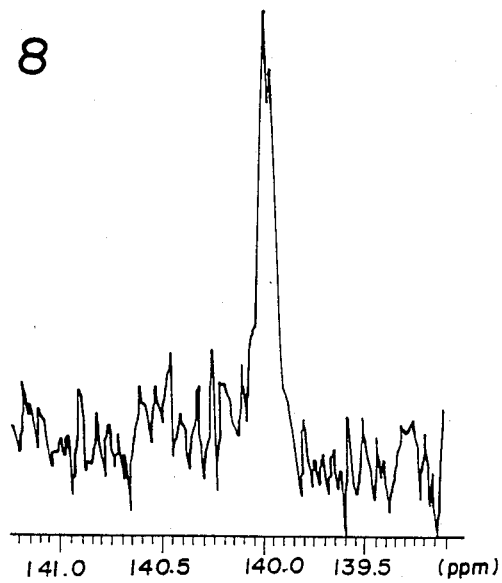

For the polymer thus obtained, the weight average molecular weight was 29,000 and the number average molecular weight was 8,800. Based on the aromatic ring $C_1$ carbon signal in $^{13}$C-NMR of the polymer (FIG. 8), it was determined that the polymer was of such syndiotactic configuration that the tacticity as determined at the racemic pentad was at least 70%.

EXAMPLE 40

The procedure of Example 22 was repeated with the exceptions that 27 g of p-tert-butylstyrene was used as a starting monomer, the amount of the cyclopentadienyltitanium trichloride used was 0.02 mmol, the amount as aluminum atom of the methylaluminoxane used was 30 mmol, and the polymerization was conducted at 50° C. for 4 hours. In this way, 25.3 g of a polymer was obtained.

Figure 9:
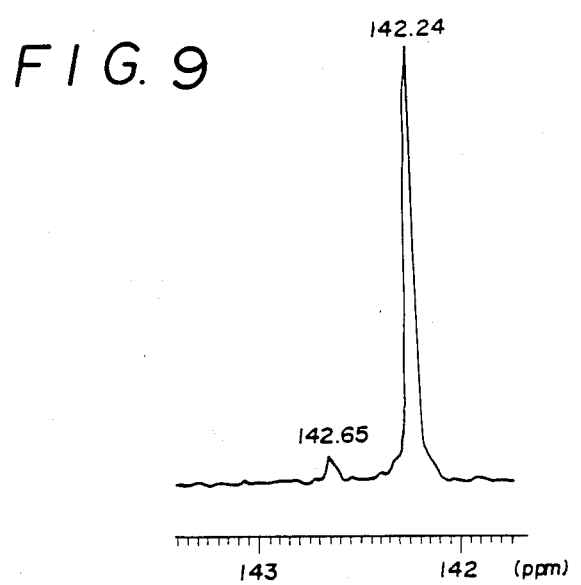

The residue after the Soxlet extraction was 99 wt. %. For the polymer, the weight average molecular weight was 71,000, the number average molecular weight was 21,000 and the melting point was 310° C. Based on the aromatic ring $C_1$ carbon signal in $^{13}$C-NMR of the polymer (FIG. 9), it was determined that the polymer was of such syndiotactic configuration that the tacticity as determined at the racemic pentad was at least 94%.

EXAMPLE 41

The procedure of Example 22 was repeated with the exceptions that a mixture of 29.5 ml of styrene and 26 ml of p-methylstyrene was used as a starting monomer, the amount of the cyclopentadienyltitanium trichloride used was 0.02 mmol, the amount of the methylaluminoxane used was 10 mmol, and the polymerization was conducted at 50° C. for 2 hours. In this way, 7 g of a copolymer was obtained.

The residue after the Soxlet extraction was 70 wt. %.

EXAMPLE 42

The procedure of Example 41 was repeated with the exception that a mixture of 53.1 ml of styrene and 5.2 ml of p-methylstyrene was used as a starting monomer. In this way, 17.8 g of a copolymer was obtained.

The residue after the Soxlet extraction was 76 wt. %. Based on the $^{13}$C-NMR analysis of the copolymer, it was determined that the polymer was of such syndiotactic configuration that the polystyrene segment had a tacticity of 72% as determined at the racemic pentad.

EXAMPLE 43

The procedure of Example 35 was repeated with the exceptions that 39.4 ml of p-methylstyrene was used as a starting monomer, the amount as aluminum atom of the methylaluminoxane used was 30 mmol, and the polymerization was conducted at 50° C. for 3 hours. In this way, 34 g of a polymer was obtained.

The residue after the Soxlet extraction was 56 wt. %. For the methyl ethyl ketone-extracted portion of the polymer, the weight average molecular weight was 33,000, the number average molecular weight was 14,000 and the melting point was 168° C. For the methyl ethyl ketone extraction residue, the weight average molecular weight was 48,000, the number average molecular weight was 23,000 and the melting point was 173° C.

EXAMPLE 44

The procedure of Example 23 was repeated with the exception that ethylaluminoxane prepared using 40 mmol of triethylaluminum was used in place of the trimethylaluminum. In this way, 0.1 g of a polymer was obtained.

Based on the $^{13}$C-NMR analysis of the polymer, it was determined that the polymer was of such syndiotactic configuration that the tacticity as determined at the racemic pentad was 80%.

EXAMPLE 45

The procedure of (2) in Example 1 was repeated with the exceptions that 0.05 mmol of cyclopentadienyl titanium dichloride was used as the titanium compound component, the amount of the methylaluminoxane used was 30 mmol (as aluminum atom), the amount of the styrene introduced was 25 ml, the amount of the toluene used was 50 ml, the polymerization temperature was 50° C. and the polymerization time was 2 hours. In this way, 9.2 g of a polymer was obtained.

The residue after the Soxlet extraction was 93.6 wt. %. For the polymer, the weight average molecular weight was 41,000 and the number average molecular weight was 24,000. The melting point and the results of the $^{13}$C-NMR analysis of the polymer were similar to those in Example 1.

EXAMPLE 46

The procedure of (2) in Example 1 was repeated with the exceptions that 0.05 mmol of bispentamethylcyclopentadienyl titanium dichloride was used as the titanium compound component, the amount of the methylaluminoxane used was 30 mmol (as aluminum atom), the amount of the styrene introduced was 25 ml, the amount of the toluene used was 50 ml, the polymerization temperature was 50° C. and the polymerization time was 2 hours. In this way, 1.6 g of a polymer was obtained.

The residue after the Soxlet extraction was 95.3%. For the polymer, the weight average molecular weight was 167,000 and the number average molecular weight was 94,000. The melting point and the results of the $^{13}$C-NMR analysis of the polymer were similar to those in Example 1.

What is claimed is:

1. A process for producing styrene polymers which comprises polymerizing styrene or styrene derivatives by the use of a catalyst comprising:
   (A) a titanium compound, and
   (B) a contact product of an organoaluminum compound and a condensation agent.

2. The process as claimed in claim 1, wherein the titanium compound is at least one compound selected from titanium compounds and titanium chelate compounds represented by the general formulae:

$$TiR^1_a R^2_b R^3_c X^1_{4-(a+b+c)} \text{ and}$$

$$TiR^1_d R^2_e X^1_{3-(d+e)}$$

(wherein $R^1$, $R^2$ and $R^3$ each represent a hydrogen atom, an alkyl group having 1 to 20 carbon atoms, an alkoxy group having 1 to 20 carbon atoms, an aryl group having 6 to 20 carbon atoms, an alkylaryl group, an arylalkyl group, an acyloxy group having 1 to 20 carbon atoms, a cyclopentadienyl group, a substituted cyclopentadienyl group or an indenyl group, $X^1$ represents a halogen atom, a, b and c each represent an integer of 0 to 4, and d and e each represent an integer of 0 to 3).

3. The process as claimed in claim 1, wherein the component (B) is a product resulting from modification of trimethylaluminum with water.

* * * * *